Sept. 10, 1940.                E. W. BRIDGE                 2,214,521
                           MASS BALLING MACHINE
                            Filed Oct. 2, 1939
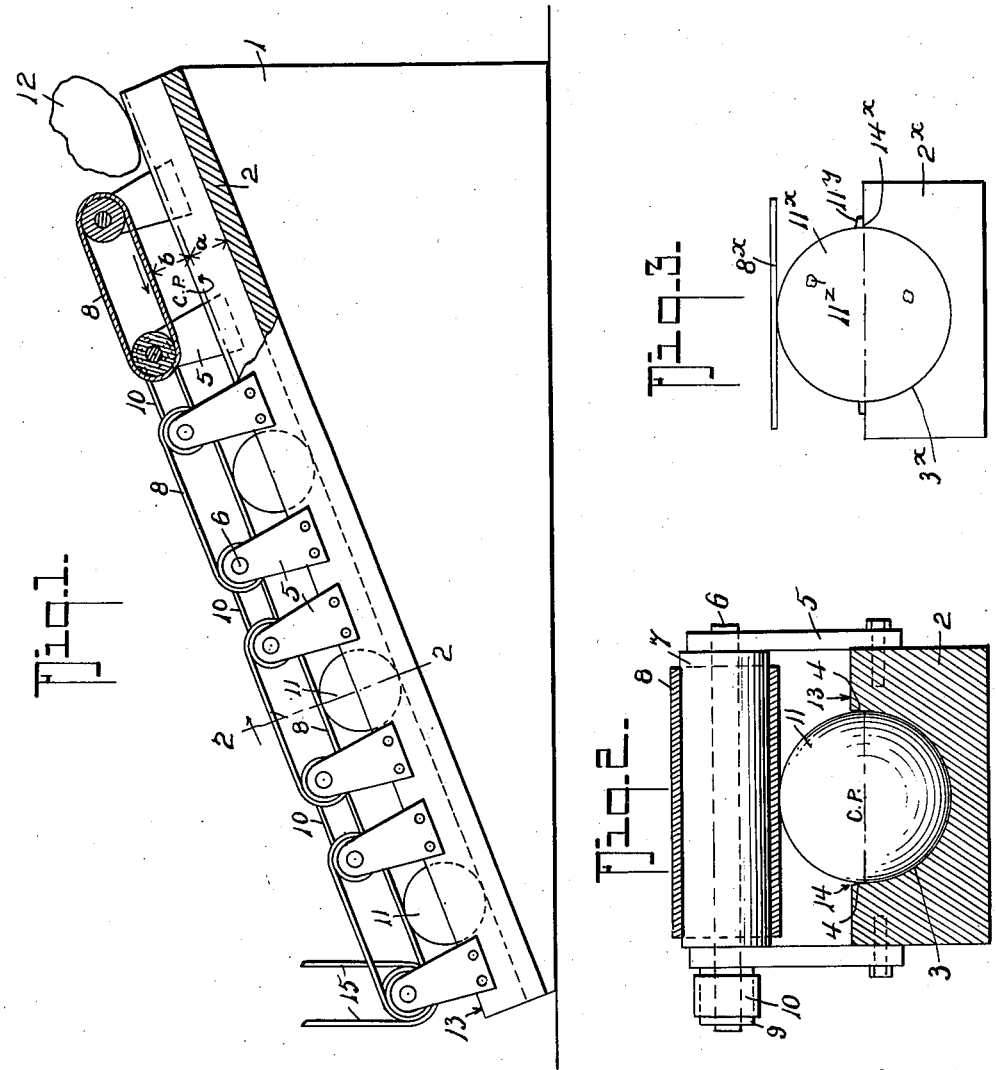
Inventor
Edward W. Bridge
By Dieterich & Rutley
Attorneys Patented Sept. 10, 1940

2,214,521

UNITED STATES PATENT OFFICE 2,214,521

MASS BALLING MACHINE

Edward W. Bridge, Philadelphia, Pa.

Application October 2, 1939, Serial No. 297,582

4 Claims. (Cl. 107—9)

My invention, which has been especially devised for forming candy into balls, although it is useful for rolling other plastic substances into balls, has for its primary object to provide a very simple, inexpensive machine for rolling a plastic mass of any shape into a perfect sphere with a smooth unbroken surface.

Heretofore, difficulty has been experienced in preventing the formation of projections or teats on the surface during the rolling process, which not only become broken off as the material sets and tend to leave pock-marks on the surface, but their formation also has some tendency to retard the rolling into a true sphere, with the result that the balls are sometimes distorted. It is therefore a further object of my invention to provide a simple machine which will eliminate these objectionable features.

Other objects of the invention will in part be obvious and in part will be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a side elevation, parts being broken away, illustrating my invention.

Fig. 2 is a cross section on the line 2—2 of Fig. 1.

Fig 3 is a diagrammatic view hereinafter again referred to.

In the drawing, 1 is a suitable support on which an inclined trough 2 is mounted. The trough 2 has its groove 3 struck on a radius equal to that which the finished ball 11 is to assume, the central horizontal plane C. P., in which the axis of curvature is located, lies, in my machine, a short distance below the top face 13 of the trough 2. Did the axis of curvature lie in the plane of the face 13 (see Fig. 3) or above the same, the ball 11$^x$ would be formed with teats 11$^y$ which, as the ball progressed down the trough, would be broken off by the edge 14$^x$ of the trough, leaving pock-marks or rough spots 11$^z$ at times. This is illustrated in Fig. 3 wherein parts corresponding to like parts in Figs. 1 and 2 have the same reference number plus the index letter $x$.

By locating the axis of the curvature of groove 3 below the level of the top 13 and continuing the sides of the groove above the axis as parallel walls 4, the formation of teats or projections, such as 11$^y$ in Fig. 3, is avoided; no material is wasted in broken-off teats, but a ball with a clear or unbroken surface over all is produced.

In order to cooperate with the trough to roll the gobs 12 into spheres, I provide one or more conveyors mounted over the trough 2 by having their pulley shafts 7 mounted in suitable bearing-supports 5, the lower flight of the conveyor belt 8 lying in a plane parallel to the axis of the groove 3 and at a distance from the top face plane 13 of the trough 2 which is less than the radius of the ball to be produced by approximately the height of the parallel wall portions 4.

Since the lower flight of the conveyor 8 should not sag, where a long trough is used two or more short conveyors 8 should be used, the several conveyors being preferably spaced an interval apart and operatively connected, as by belts 10 and pulleys 9 for example, and driven at one end, as at 15, by any suitable motive power. Spacing the adjacent conveyors to give the mass short rest periods helps the quality of the article 11 produced.

In my machine the edges 14, being spaced from the ball, do not cause formation of teats, but actually prevents their formation as substantially all material of the gob 12 finds its way into the finished ball.

From the foregoing description, taken in connection with the accompanying drawing, it is thought that the construction, operation and advantages of the invention will be clear to those skilled in the art to which it relates.

What I claim is:

1. In a plastic mass balling machine, a downwardly inclined trough having a groove the axis of curvature of which lies below the top of the trough, and at least one gob-rolling conveyor belt cooperating with said trough, the lower flight of said belt lying parallel to the top of the trough, the side walls of said groove between the top of the trough and a plane parallel thereto and containing the axis of the curve of the groove being straight and parallel to one another.

2. In a plastic mass balling machine, a downwardly inclined trough having a groove the axis of curvature of which lies below the top of the trough, and at least one gob-rolling conveyor belt cooperating with said trough, the lower flight of said belt lying parallel to the top of the trough and at a distance therefrom which is less than one-half the diameter of the ball to be produced, the side walls of said groove between the top of the trough and a plane parallel thereto and containing the axis of the curve of the groove being straight and parallel to one another.

3. In a plastic mass balling machine, a trough having a longitudinal groove the axis of curvature of which lies below the level of the top face of the trough, the side walls of the groove above the level of the axis of curvature being straight and parallel to one another, and a plurality of belt-conveyors serially arranged above said trough, the lower flight of the conveyors lying parallel to said axis and the top of the trough and spaced from the top of the trough a distance equal to not more than the radius of the ball to be produced, said trough and conveyors being inclined to the horizontal and said conveyors being spaced apart to provide intervals along which the mass rolls free of the belts.

4. In a plastic mass balling machine, a trough having a longitudinal groove the axis of curvature of which lies below the level of the top face of the trough, and a plurality of belt-conveyors serially arranged above said trough, the lower flight of the conveyors lying parallel to said axis and the top of the trough and spaced from the top of the trough a distance equal to not more than the radius of the ball to be produced, said trough and conveyors being inclined to the horizontal and said conveyors being spaced apart to provide intervals along which the mass rolls free of the belts.

EDWARD W. BRIDGE.